Feb. 19, 1929.
J. R. GAMMETER
1,702,647
WHEEL RIM AND TIRE STRUCTURE
Filed Oct. 6, 1921
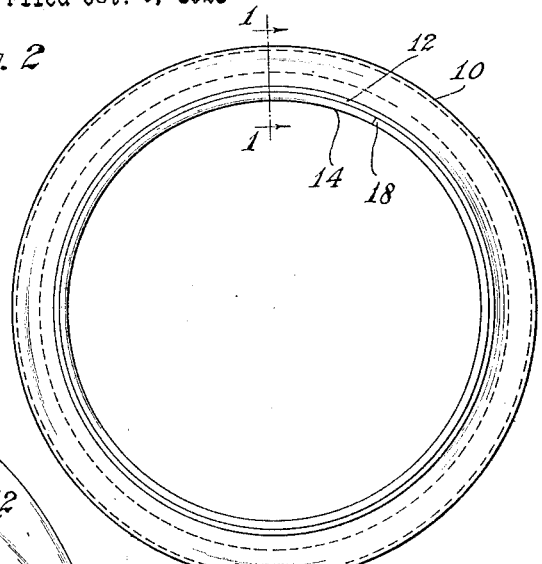
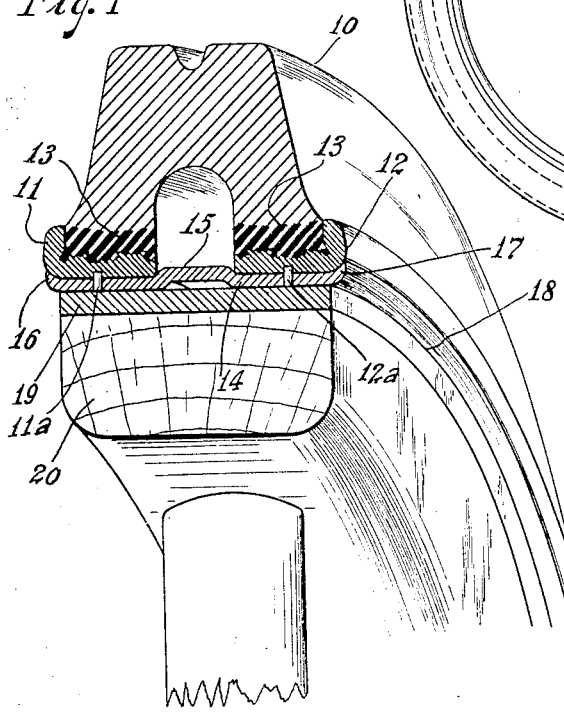
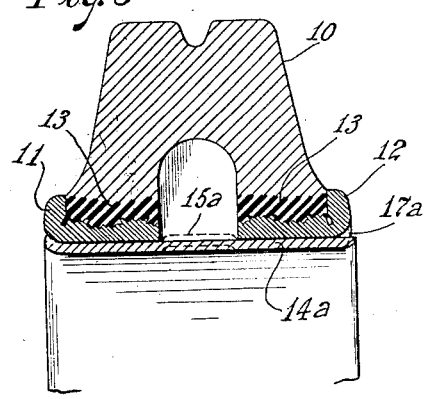
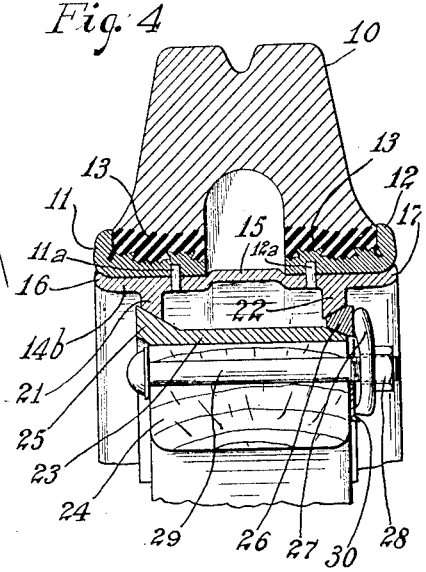
Inventor:
John R. Gammeter.
By Robert M. Pierson
Atty.

Patented Feb. 19, 1929.

1,702,647

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

WHEEL RIM AND TIRE STRUCTURE.

Application filed October 6, 1921. Serial No. 505,883.

This invention relates to vehicle wheel rim and tire structures, and particularly to structures comprising a cushion tire having an arched body portion with its legs secured to separate annular base members.

One of my objects is to provide an improved structure wherein the cushion or body portion of a tire having an arched cross-sectional form may be vulcanized upon separate base members, each leg of the tire-body thus being secured to one of said base members, and whereby said base members may be securely held in proper spaced relation upon the wheel. A further object is to provide a structure which may be quickly and easily assembled and disassembled for the mounting or removal of the tire.

Of the accompanying drawings:

Fig. 1 is a fragmentary view, in section and perspective, of a wheel, rim and tire structure showing an embodiment of my invention adapted for use with a cylindrical felly-band adapted to receive a tire in "pressed-on" relation.

Fig. 2 is a side elevation of the same on a smaller scale, showing, at line 1—1, where the section of Fig. 1 is taken.

Fig. 3 is a sectional view of a tire and an auxiliary base member, illustrating a method of forming the latter.

Fig. 4 is a sectional view of an embodiment suited for a wheel having a felly-band adapted to receive a common form of demountable tire-carrying rim.

Referring to the drawings, 10 is the tire-body or cushion tire having an arched cross-sectional form, each leg thereof being secured by vulcanization to an annular base member 11, 12. The tire-body usually is built upon the base members and upon a sectional core interposed between them, the core being removed after the tire has been vulcanized. 13, 13 are layers of hard rubber compound used between the base members 11, 12 and the cushion 10 to obtain good adhesion of the tire-body to the base members.

For holding the base members 11, 12, I provide an auxiliary base member or ring 14 (Fig. 1) formed with circumferential rib 15 adapted to lie between the base members 11, 12 when said ring is inserted within the latter, and with outwardly-turned side flanges 16, 17 adapted to fit the outer shoulders of said base members to prevent the latter from spreading apart. The ring 14 may be transversely split, as indicated at 18 (Figs. 1 and 2), and sprung into place within the base members 11, 12, or it may be continuous, in which latter case especially I prefer to give it first the form shown in full lines in Fig. 3, the ring here being designated 14$^a$, mount the tire upon it, and then bend or deform the metal of the ring, forcing it outward, as by rolling or swaging, to form the circumferential rib and the last-formed side flange, as indicated by the dotted lines at 15$^a$ and 17$^a$ respectively in Fig. 3. In the embodiment illustrated in Figs. 1, 2 and 3, the tire with the ring therein, whether the latter be split or not, may be simply pressed onto the felly-band or fixed rim member 19 upon the felly 20, as is commonly done with solid tires having an integral metal base, the seating surface of the tire base being, as usual, slightly smaller in circumference than the outer surface of the felly band, and its rounded margin on the advancing side, formed by the outwardly-turned flange 16 or 17, exerting a wedging action as the tire is advanced laterally onto the wheel by the operation of the press, which wedging action sets up a tension or contracting stress in the tire base tending to hold it tightly in place when once forced onto the wheel. While the tire bases 11, 12, and the auxiliary base 14 are thus frictionally held against relative circumferential movement, dowels 11$^a$, 12$^a$ may be provided between the base members and the auxiliary base, either with or without the rib 15 and the flanges 16, 17, to prevent circumferential as well as lateral relative movement.

The modified form of ring or auxiliary base designated 14$^b$ in Fig. 4 is adapted to serve as a demountable rim, being provided with circumferential seating flanges 21, 22, formed with oppositely beveled, annular, seating surfaces which are of least diameter at the adjacent or inner sides of said flanges. It is thus adapted to seat upon a fixed rim or felly-band 23 upon a felly 24, said felly-band being formed at one side with a circumferential rim-seating flange 25 beveled to fit the seating face of the flange 21, and at the other side beveled to receive a wedging ring 26, which preferably is transversely split and so formed as to engage in a wedging action both the fixed rim or felly-band 23 and the flange 22 of the auxiliary rim 14$^b$. 27 is one of a set of clamps adapted to force the wedging ring 26 into position, under action of a nut 28 upon a bolt 29 mounted in the felly 24. 30 is a metal washer upon the bolt 29 for supporting the inner end of the clamps 27 and thus protecting the felly from indentation or defacement thereby.

In this embodiment the auxiliary base or carrying rim 14$^b$ may be endless, and the circumferential rib 15 and the side flanges 16, 17 may be formed by rolling or swaging in place, as above described, or it may be transversely split and, having been previously formed or provided with the circumferential rib, or other spacing means, and with the side flanges, may be sprung into position within the tire, the base members 11, 12 providing sufficient circumferential strength for the structure.

In both of these embodiments the base members 11, 12 of the tire are securely held in proper spaced relation, the auxiliary base member, 14 or 14$^b$, being wedged outward and thus held in firmly interlocked relation to the tire-base members by the fixed rim member or felly-band, 19 or 23 and my invention thus renders it highly practical to construct the tire with completely separated base members, permitting, in the forming of the tire-body, the use of an annular, sectional molding core which may readily be withdrawn from the tire-body after the latter has been vulcanized to its base members. My invention also provides a convenient form of carrying support for such a tire.

The specific embodiment of my invention shown in Fig. 4 is the subject of a divisional application, Serial No. 591,786, filed by me October 2, 1922, and entitled Tire and rim structure, and the method of forming the structures herein described is the subject matter of my divisional application Serial No. 747,677, filed November 3, 1924.

Various modifications, especially as regards the manner of mounting the auxiliary base or carrying rim upon the wheel, may be resorted to without departing from the scope of my invention as defined by the claims, and I do not limit my claims wholly to the specific construction shown.

I claim:

1. A rim and tire structure comprising a plurality of annular tire-base members, a cushion tire vulcanized thereon and a single, integral auxiliary base member common to said tire-base members, mounted within the same and constituting their principal immediate support, said auxiliary base members being provided with spacing means between said tire-base members and with side flanges retaining said tire-base members thereon.

2. A rim and tire structure comprising a plurality of metal base rings, a cushion tire-body vulcanized thereon, a transversely-split auxiliary ring mounted concentrically within said base rings and serving as radial support therefor, said auxiliary ring having an outwardly-projecting portion between said base rings for holding them in spaced-apart relation and having outwardly-projecting edge portions embracing the outer margins of the base rings for holding them against lateral separation.

3. The combination with a pair of base members of a locking ring adapted to lock said members together, and means adapted to be deformed to secure said locking ring in place, said locking ring being adapted to maintain the base members in fixed relationship when said locking ring is secured in place by deforming said means.

In witness whereof I have hereunto set my hand this 4th day of October, 1921.

JOHN R. GAMMETER.